(12) United States Patent
Gulbransen et al.

(10) Patent No.: US 12,309,511 B2
(45) Date of Patent: May 20, 2025

(54) CODED APERTURE FOCAL PLANE ARRAY USING ALL DETECTORS

(71) Applicant: Raytheon Company, Waltham, MA (US)

(72) Inventors: David J. Gulbransen, Fairview, TX (US); Jae Hyun Kyung, Redondo Beach, CA (US); Christian M. Boemler, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 237 days.

(21) Appl. No.: 18/072,932

(22) Filed: Dec. 1, 2022

(65) Prior Publication Data

US 2024/0187749 A1   Jun. 6, 2024

(51) Int. Cl.
*H04N 25/443* (2023.01)
*H04N 25/441* (2023.01)
*H04N 25/704* (2023.01)
*H04N 25/707* (2023.01)
*H04N 25/78* (2023.01)

(52) U.S. Cl.
CPC ......... *H04N 25/443* (2023.01); *H04N 25/441* (2023.01); *H04N 25/704* (2023.01); *H04N 25/707* (2023.01); *H04N 25/78* (2023.01)

(58) Field of Classification Search
None
See application file for complete search history.

(56) References Cited

U.S. PATENT DOCUMENTS

| 5,905,818 | A  | * | 5/1999 | Ni | H04N 3/155 348/E3.018 |
|---|---|---|---|---|---|
| 7,532,772 | B2 |  | 5/2009 | Brady | |
| 9,445,115 | B2 |  | 9/2016 | Deweert et al. | |
| 9,983,063 | B1 |  | 5/2018 | Tener et al. | |
| 10,909,670 | B2 | * | 2/2021 | Milstein | G06T 5/50 |

(Continued)

OTHER PUBLICATIONS

International Search Report with Written Opinion issued in International Application No. PCT/US2023/036657; International Filing Date Nov. 2, 2023; Date of Mailing Jan. 29, 2024 (15 pages).

(Continued)

*Primary Examiner* — James M Hannett
(74) *Attorney, Agent, or Firm* — CANTOR COLBURN LLP (57) ABSTRACT

A sensing system includes a focal plane array, a detector dual-input circuit, a detector selector circuit and a select module. The focal plane array includes a plurality of detectors. The detector dual-input circuit combines outputs from the detectors received at a first input channel without outputs received at a second input channel. The detector selector circuit establishes a first signal path between the detectors and the first input channel and a second signal path between the detectors and the second input channel. The detector selector circuit includes a mask that maps the detectors to a first detector group or a second detector group. Based on the mask designation, the select module connects one or more of the detectors to the first signal path to establish the first detector group and connects one or more of the detectors to the second signal path to establish the second detector group.

19 Claims, 8 Drawing Sheets

(56) References Cited

U.S. PATENT DOCUMENTS

| | | |
|---|---|---|
| 11,153,522 B2 | 10/2021 | Cook |
| 11,303,839 B1 | 4/2022 | Gulbransen et al. |
| 2006/0038705 A1* | 2/2006 | Brady ........................ G06T 9/00 |
| | | 375/E7.226 |
| 2018/0260649 A1* | 9/2018 | Kadambe ................ H04N 5/919 |
| 2020/0225089 A1* | 7/2020 | Arce ..................... G01J 3/0229 |
| 2021/0168315 A1* | 6/2021 | Cook ................... H04N 25/443 |

OTHER PUBLICATIONS

Robucci et al., "Compressive Sensing on a CMOS Separable-Transform Image Sensor" Proceedings of the IEEE, IEEE, vol. 98, No. 6 (Jun. 2010) pp. 1089-1101.

* cited by examiner

CODED APERTURE FOCAL PLANE ARRAY USING ALL DETECTORS

BACKGROUND

The present disclosure relates to sensors, and more particularly, to sensors having a coded aperture focal plane array.

As is known in the art, various types of sensors can be used for situational awareness (SA) for vehicles, installations, aircraft, satellites, ships, and the like. Hemispherical (2 pi steradians), spherical (4 pi steradians), etc., fields of view (FOVs) are utilized to improve situational awareness (SA) around targeted assets (e.g., ground vehicles, airborne vehicles, naval vehicles, and infrastructures) at relatively high resolution to not only detect and track inbound combat threats, but also assist in non-combat missions.

SUMMARY

According to a non-limiting embodiment, a sensing system comprises a focal plane array, a detector dual-input circuit, a detector selector circuit, and a select module. The focal plane array can be part of a readout integrated circuit package, and includes an n×m array of detectors that establish an output pixel. The values n and m are array element index values. The detector dual-input circuit is configured to combine outputs from the detectors received at a first input channel without outputs from the detectors received at a second input channel. The detector selector circuit establishes a first signal path between the detectors and the first input channel and a second signal path between the detectors and the second input channel. The detector selector circuit includes an electronic mask which forms a part of the focal plane array in the pixel and is configured to map the detectors to one or both of a first detector group (Group A) and second detector group (Group B). The select module connects one or more of the detectors to the first signal path to establish the first detector group and connects one or more of the detectors to the second signal path to establish the second detector group. The select module connects the one or more of the detectors to the first and second signal paths to establish the first and second detector groups based on the mask.

According to another non-limiting embodiment, a method of generating image data comprises arranging a plurality of detectors in an n×m array to establish a focal plane array and a single output pixel. The focal plane array comprises part of a readout integrated circuit package, and the values n and m are array element index values. The method further comprises generating an output signal from one or more of the detectors in response to detecting light, and combining output signals received at a first input channel of a detector dual-input circuit with output signals received at a second input channel of the detector dual-input circuit. The method further comprises establishing, by a detector selector circuit, a first signal path between the detectors and the first input channel and establishing, by the detector selector circuit, a second signal path between the detectors and the second input channel. The method further comprises designating the detectors to a first detector group (Group A) or to a second detector group (Group B) using a mask forms a part of the focal plane array. The method further comprises connecting, by a select module, one or more of the detectors to the first signal path to establish the first detector group based on the mask and connecting, by the select module, one or more of the detectors to the second signal path to establish the second detector group based on the mask.

According to yet another non-limiting embodiment, a detector selector circuit comprises a focal plane array having an n×m array of detectors that establishes an output pixel. The values n and m are array element index values. A first signal path is in signal communication with a first input channel of a detector dual-input circuit, and a second signal path is in signal communication with a second input channel of the detector dual-input circuit. The detector selector circuit further includes a plurality of switch circuits. Each switch circuit is configured to selectively connect a respective detector included in the array of the detectors to the first signal path or the second signal path.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Conventional sensor systems can include a multitude of overlapping distributed aperture sensors each with its own large format focal plane array (FPA) or scanning or step-stare systems using smaller numbers of FPAs at the cost of reduced update rates for the full field of regard. Other systems have attempted to combine attributes to produce a relatively low resolution distributed aperture sensors to reduce the number of cameras albeit with a large instantaneous field of view (IFOV) that can be supplemented with a narrow FOV imager on an agile gimbal for interrogation and high resolution imaging. Conventional computational imaging-based systems employ signal processing techniques to enhance the resolution of smaller pixel count systems or increase the field of regard of a smaller sensor by introducing additional optical elements to create coded apertures (CAs), optical multiplexers, spatial light modulators (SLM), etc. In other known systems, to enhance resolution, pixel dithering can be used to improve spatial resolution of a non-diffraction-limited system.

Sensor systems including a focal plane array for coded aperture (CA) sensing have been developed to enhance resolution by using computational imaging techniques (e.g., performed by an image controller) in combination with a readout array for compressive sensing electronically applies an aperture, or in general, an encoded electronic mask inside of the focal plane array instead of using a conventional separate movable optical element or spatial light modulator. The readout array can interface a single readout pixel to an n×m array of smaller detectors (e.g., photodiodes) and provide a mechanism for dynamically selecting a sequence of encoded masks in real time at video rates. Aperture mask patterns can then be programmed into a readout integrated circuit (ROIC), and can be applied in multiple regions of interest windows where enhanced resolution is desired while reading out the rest of the array at the ROIC pixel resolution.

However, known sensor systems that perform image reconstructions based on CA sensing suffer from an n×n frame latency. In addition, the coded CA sensing performed in known sensor systems either switch off (e.g., shunt the detector to ground; 0V) half the detectors or optically block the incident irradiance from half the detectors in each pixel pattern and disregard the switched off or blocked detectors when performing the image reconstruction. For instance, outputs of a subset of detectors are shunted to ground or the incident irradiance is blocked thereby discarding their optical signal. This results in the loss of half of the optical signal incident on each ROIC pixel. Since for a background limited sensing device, the sensitivity is proportional to the square root of the optical signal, the loss of half the signal results in a sensitivity loss of $\sqrt{2}$. Consequently, half of the optical signal for each pixel pattern is disregarded and wasted, thereby limiting the sensitivity of the reconstructed image.

Various embodiments described herein provide an improved CA focal plane array that utilizes the optical signal of all individual detectors (i.e., pixels) included in each pixel pattern when performing image reconstruction thereby improving sensitivity by approximately 40% ($\sqrt{2}$).

Figure 1:
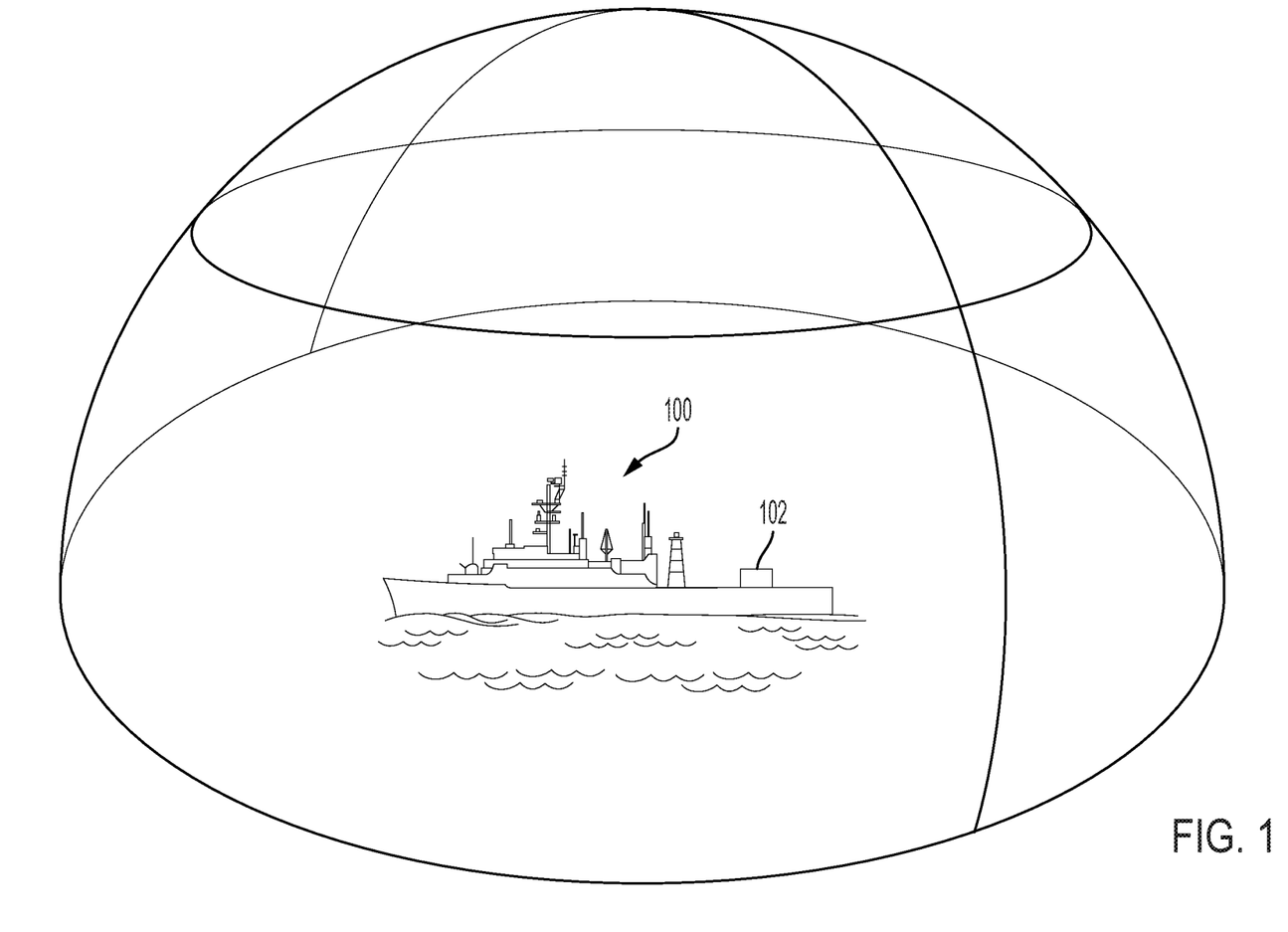
FIG. 1 illustrates a vehicle including a sensory system that implements an improved coded aperture (CA) focal plane array (FPA) according to a non-limiting embodiment.

With reference now to FIG. 1, a vehicle 100 including a sensor system 102 installed with a sensor system 102 that implements a coded aperture focal plane array (FPA) is illustrated in accordance with a non-limiting embodiment of the disclosure. Although the vehicle 100 is illustrated as a naval vehicle (e.g., a ship), embodiments of the sensor system 102 described herein can be implemented to other types of vehicles or structures including, but not limited to, ground-based vehicles, aircraft, buildings, structures, unmanned aerial vehicles, geographical areas, and the like. In addition, any practical FOV can be provided by coded aperture FPAs to meet the needs of a particular application. In some embodiments, a portion of a FOV can be the focus of the sensor system to facilitate improved resolution compared to known FPAs.

The sensor system 102 has a field of view (FOV) that can provide some level of situational awareness (SA) for the vehicle 100. In a non-limiting embodiment, the sensor system 102 provides hemispherical (e.g., 2 pi steradians) SA at an improved resolution (compared to known coded aperture FPAs) to not only detect and track multiple potential threats, but also to provide assistance in various non-combat missions. Other embodiments for airborne or spaceborne systems full spherical (e.g., 4 pi steradians) coverage is provided.

Figure 2A:
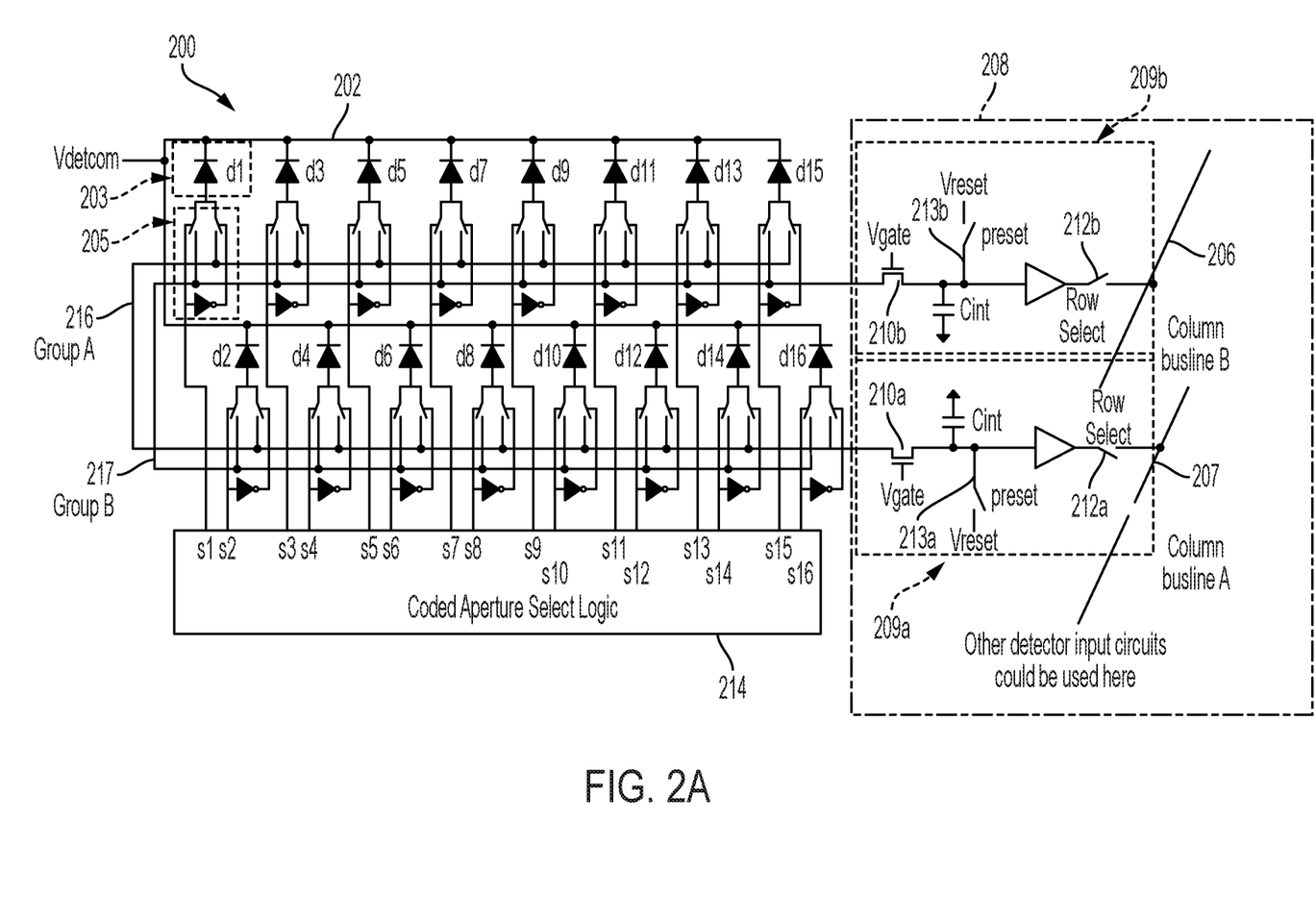
FIG. 2A is a schematic representation of an example readout integrated circuit (ROIC) input circuit implementation of a coded aperture focal plane array in accordance with non-limiting embodiments of the disclosure.
Figure 2B:
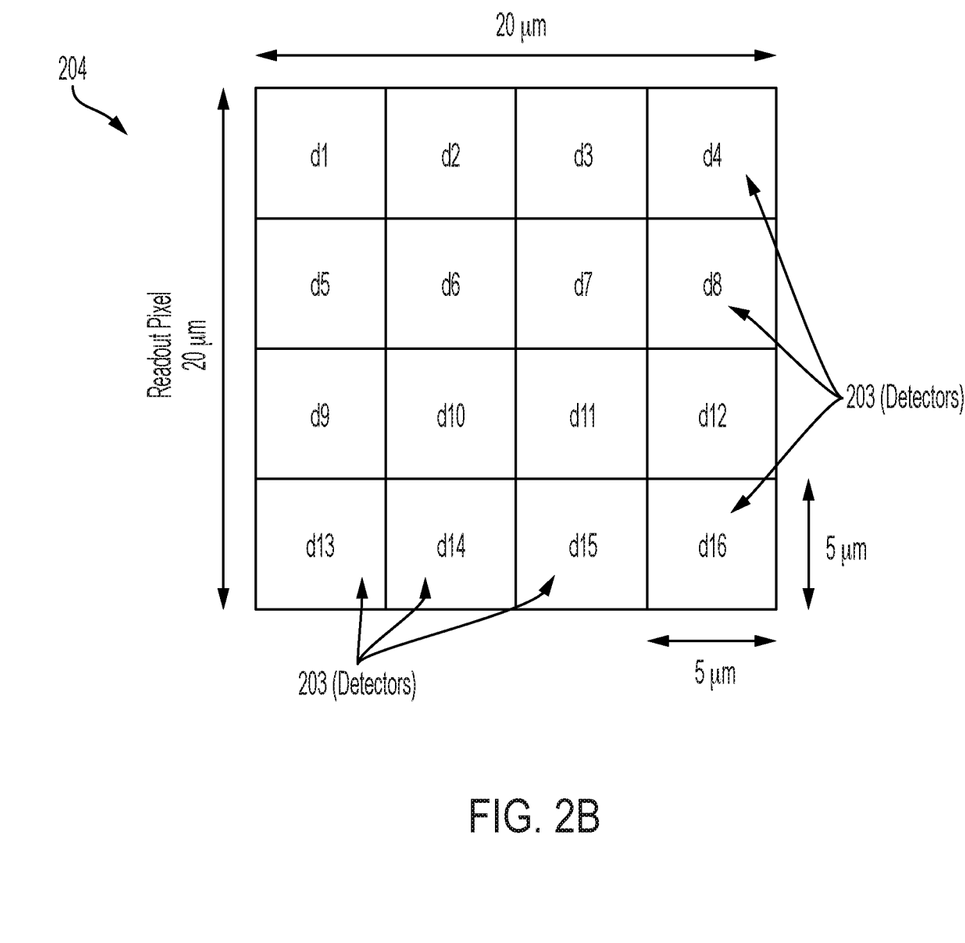
FIG. 2B is a block diagram of an example implementation of a coded aperture focal plane array readout pixel with 16 subpixel detectors in a 4×4 array in accordance with non-limiting embodiments of the disclosure.

Referring now to FIGS. 2A and 2B, portions of a readout integrated circuit (ROIC) 200 are illustrated according to a non-limiting embodiment. The readout integrated circuit (ROIC) 200 can be implemented as an integrated circuit (IC) for image reading sensing elements or detectors, such as infrared and ultraviolet light sensors or photodiodes, for example. ROICs operate by accumulating photocurrent from each pixel and transferring the resultant signal onto output taps for readout. U.S. Pat. No. 10,097,774, which is assigned to Raytheon Company and incorporated herein by reference, discloses an example ROIC.

It is understood that any practical n×m array format or size of detectors can be used to meet the needs of a particular application. In some embodiments, n does not equal m. While in the illustrated embodiment, diode-based detectors are used, it is understood that any suitable type of detector can be used including dual or multi-color detector diodes, or avalanche photo diodes. The detector can be sensitive to any wavelength of light from ultraviolet to beyond the long wavelength infrared or sub-wavelength band in this range.

The ROIC 200 implements a detector selector circuit 202 configured to selectively connect individual detectors (e.g., photodiodes) 203 (d1-d16) included in or hybridized to a ROIC pixel 204 (see FIG. 2B) to one of two input channels 209a or 209b. According to a non-limiting embodiment, each detector 203 is coupled to a switch circuit 205. Each switch circuit 205 selectively connects the detector 203 to the first signal path or the second signal path, and selectively connects or disconnects the detector 203 to or from a coded aperture select module 214. Accordingly, the switch circuit 205 selectively connects the detector 203 to the first signal path (e.g., signal path 216 associated with the first detector group 216 (Group A), or the second signal path (e.g., signal path 217 associated with the second detector group 217 (Group B) as controlled by the coded aperture select module 214.

The ROIC 200 outputs a single ROIC pixel 204 per frame via a detector dual-input circuit 208. It should be appreciated that while the detector dual-input circuit 208 shown is a direct injection (DI) type circuit other classes of detector input circuits including but not limited by a charge transimpedance amplifier (CTIA), source follower per detector (SFD), gate modulation, etc. could be used instead, such as those disclosed in U.S. Pat. Nos. 4,445,117 and 5,083,016, which are incorporated herein by reference. Further the DI circuit shown as well as the other circuits could include an in pixel sample/hold circuit or other noise reduction circuitry such as correlated double sampling. The DI circuit shown could also be a dual polarity circuit allowing a bias selectable two color detector to be used. Example DI circuits are disclosed in U.S. Pat. Nos. 5,043,820, 5,128,534, and 7,586,074, which are incorporated herein by reference.

With continued reference to FIGS. 2A and 2B, the detector dual-input circuit 208 includes a first input channel 209a and a second input channel 209b. The first input channel 209a includes a first direct injection input buffer 210a, a first row select switch 212a, and a first voltage preset switch 213a. An input of the first input channel 209a is connected to a first input of the detectors 203 (d1-d16) via a first signal path to define a first detector group (Group A) 216. The output of the first input channel 209a is selectively connected to a first column busline (busline A) 207, via the first row select switch 212a. Accordingly, the first direct injection input buffer 210a and the first row select switch 212a can be controlled to output a first portion (e.g., a first half) of the ROIC pixel 204 to the first column busline 207 based on the voltage applied to the detectors 203 included in the first detector group 216 (Group A).

Likewise, the second input channel 209b includes a second direct injection input buffer 210b, a second row select switch 212b, and a second voltage preset switch 213b. An input of the second input channel 209b is connected to a second input of the detectors 203 (d1-d16) via a second signal path to define a second detector group (Group B) 217. The output of the second input channel 209b is connected to a second column busline (busline B) 206, via the second row select switch 212b. Accordingly, the second direct injection input buffer 210b and the second row select switch 212b can be controlled to output a second portion (e.g., the remaining second half) of the ROIC pixel 204 to the second column busline 206 based on the voltage applied to the detectors 203 included in the second detector group 217 (Group B).

The first input channel 209a and the second input channel 209b can be controlled to read out data from the detectors 203 (d1-d16) and deliver the data to the first column busline 207 and the second column busline 206, respectively. While the circuit diagrams 209a and 209b provide analog outputs, the circuits may be modified to perform an analog to digital conversion in the pixel array to provide a pair of digital outputs from the ROIC pixel 204.

Figure 3:
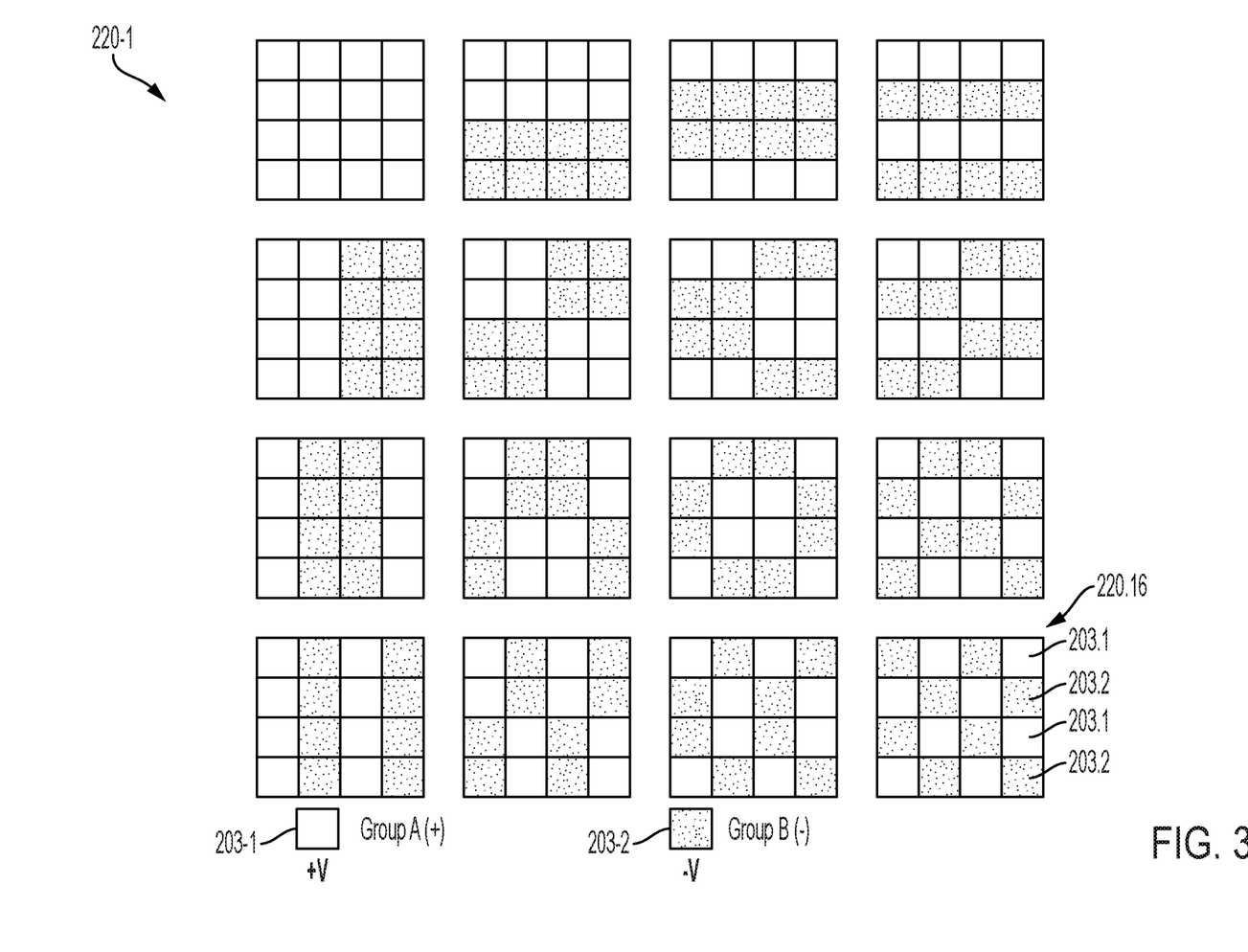
FIG. 3 illustrates example aperture masks for a coded aperture focal plane array in accordance with non-limiting embodiments of the disclosure.

In the embodiment where the ROIC pixel outputs on column buslines 206 and 207 are analog, the analog outputs are converted to the digital domain by an analog to digital converter placed at the edge of the pixel array in each column or group of columns. The digital values corresponding to the group A and group B pixels are subtracted from each other (A–B). By cycling through different combinations of pixels as shown in FIG. 3, the high resolution spatial information is encoded into temporal domain across multiple frames of low resolution pixel outputs. In addition, the digital values corresponding to the Group A and Group B pixels may be added together (A+B) to provide a low resolution output using all detectors.

According to a non-limiting embodiment, the image data can be generated based on a combination of the outputs from the detectors included in the first detector group (Group A) and the outputs of the detectors included in the second detector group (Group B). Accordingly, a signal readout to a readout integrated circuit (ROIC) can be achieved by performing either a summation or subtraction of the combination of the outputs from the detectors included in the first detector group (Group A) and the outputs of the detectors included in the second detector group (Group B). In one example, a signal readout to a readout integrated circuit (ROIC) can be achieved by performing analog-to-digital conversion of each the outputs from the detectors included in the first detector group (Group A) and the outputs of the detectors included in the second detector group (Group B) into separate digital registers of the ROIC.

In another example, the subtraction operation can include computing in the analog domain a difference between the outputs from the detectors included in the first detector group (Group A) and the outputs of the detectors included in the second detector group (Group B). The subtraction can be facilitated using either a differential amplifier or by integrating in opposite directions across a capacitor.

In embodiments, each of the detectors 203 (d1-d16) can be connected to input channel A (209a) or input channel B (209B) at a given time by a coded aperture select module 214. Accordingly, the combination of the Group A, Group B, form patterns for generating outputs that can be processed in accordance with computational imaging techniques performed by an image controller (not shown), for example. The select module 214 can be located within the ROIC pixel area or can be located in the periphery of the ROIC 200 (e.g., outside the pixel area).

Therefore, one or more non-limiting embodiments of the present disclosure overcomes the limitations of known coded aperture focal plane arrays by duplicating the input circuit 209a to integrate the signal from the Group B detector outputs allowing it to be combined with the Group A outputs (e.g., using the detector dual-input circuit 208) to achieve improved sensitivity.

FIG. 3 shows an example of sixteen coded aperture masks 220.1-220.16 used to perform image reconstruction. Each of the coded masks 220.1-220.16 utilizes sixteen detectors 203, some of which are mapped to a first group 203.1, e.g., Group A (shown in green), and some of which are mapped to a second group 203.2, e.g., Group B (shown in blue). While sixteen aperture masks 220.1-220.16 are shown it is understood that any practical number and type of masks can be used to meet the needs of a particular application. In addition, the number of Group A or Group B detectors 203 for the aperture masks 220.1-220.16 in the sequence can vary. In the illustrated aperture masks 220.1-220.16, except for a first mask 220.1 (shown in the upper left corner), in which all detectors 203 in Group A 203.1, half of the detectors 203 are connected to Group A 203.1 while the remaining half of the detectors 203 are connected to Group B 203.2.

According to a non-limiting embodiment, the ROIC 200 can sequence or cycle through the aperture masks 220.1-220.16 according to a timing scheme or frame rate set by select logic. The select logic can either be implemented in the pixel and/or in a peripheral controller section that drives the detector selector circuit in the pixel array. In some embodiments the select logic, which is programmable and can be stored in the coded aperture select module 214, allows the select module to select and cycle through the aperture masks 220.1-220.16. In other embodiments the select logic is hardcoded. In other embodiments, different patterns of the aperture masks 220.1-220.16 can be programmed into the ROIC 200 or hardcoded into the array.

By sequencing through the aperture masks 220.1-220.16 to map which detectors 203 are connected to either Group A or Group B, information from the individual detectors 203 can be obtained instead of just the aggregate detector information, e.g., a single output pixel with all detectors 203 selected. The array output from each aperture mask 220.1-220.16 can be processed using computational imaging techniques performed by an image controller, for example, to increase the resolution of the array. For example, a 24 k×24 k FPA can be created while "only" reading out 6 k×6 k pixels in any given frame using a 4×4 coded aperture pixel. It is understood that other computational imaging techniques could be applied to exploit the mask patterns for other applications including but not limited to event detection, motion target indication, and passive depth imaging. In embodiments, the patterns of the aperture masks 220.1-220.16 are changed at the frame rate. In addition, coded aperture resolution enhancements can be applied to a number of smaller regions of interest in the FOV to reduce the computational bandwidth.

Figure 4:
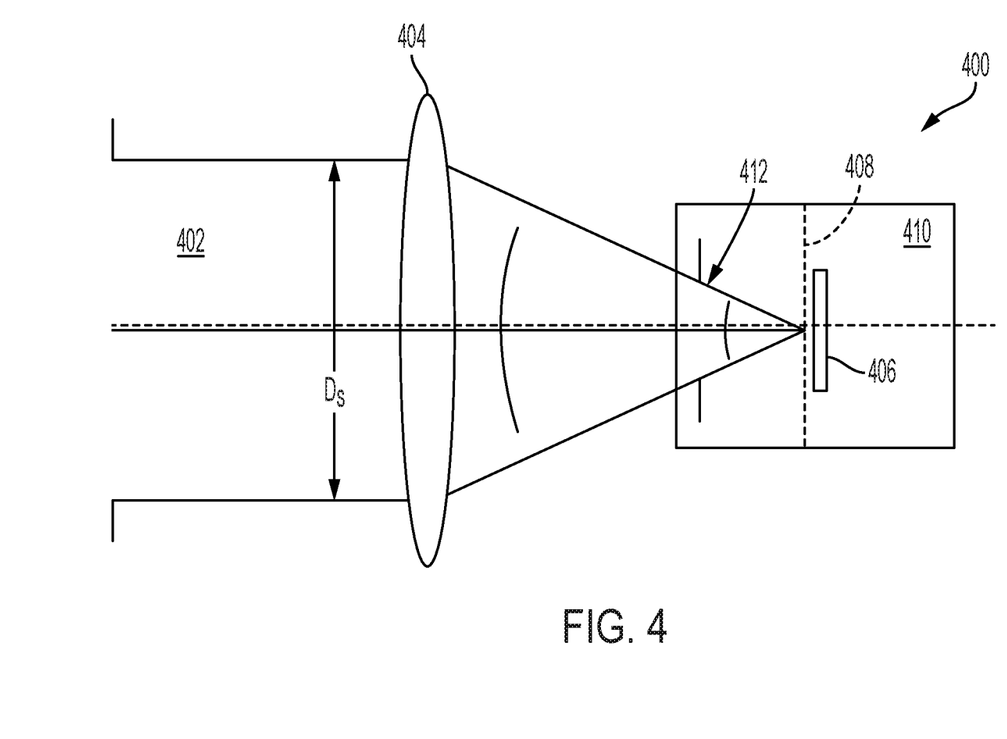
FIG. 4 is a schematic representation of example implementation system having a coded aperture focal plane array in accordance with non-limiting embodiments of the disclosure.

FIG. 4 shows an example optical imaging system 400 having a coded aperture focal plane array in accordance with example embodiments of the disclosure. An entrance pupil 402 has a diameter Ds that provides a path to an imager 404 that can include one or more lenses. The imager 404 focuses light onto a focal plane array 406. In embodiments, a mask 408, such as a Hadamard mask, is provided as part of the focal plane array 406, as described above.

In embodiments, the FPA 406 is located within an enclosure 410 that is chilled to a selected temperature in order to reduce or eliminate stray photons from impinging on the FPA 406 and degrading accuracy of the sensor. The enclosure 410 can include a cold stop 412 at the perimeter of the controlled temperature area.

In known optical systems, an intermediate image must be formed between an imager and a re-imager, which focuses light onto an FPA 406. A mask must be located at the intermediate image. The intermediate image plane in such a system must have exquisite wave front error (WFE) quality to achieve diffraction limited performance. The optical system must be designed to minimize the WFE at both the intermediate image plane and the actual image plane where the FPA 406 is located. In addition, these masks require a separate optical element distinct from the actual detector or focal plane array (FPA) 406.

The optical system 400 with a coded aperture FPA 406 described above eliminates the need for a re-imager or intermediate image. In addition, example embodiments of the disclosure eliminate the need for a separate moveable or electrically switchable optical element, such as a spatial light modulator (SLM). The benefits of the optical system embodiments described above over conventional systems will be readily apparent to one skilled in the art. Additionally, standard SLM-based optical system utilize a single FPA at the image plane, which would have similar signal loss of half the pixels of the FPA per frame. Alternatively, a dual FPA system can be constructed whereby the SLM is a digital Micro-Electro-Mechanical (MEM)s array with mirrored surfaces that has a bi-static state (e.g., "on" and "off" positions). In the "on" position, the SLM would send half of the light (half of the pixels) to one FPA and the "off" positioned elements would be directed to another FPA. The combined dual FPA system would recover both groups of pixels for image reconstruction. However, this system would be more complex and have another FPA and associated electronics and cooler.

Figure 5:
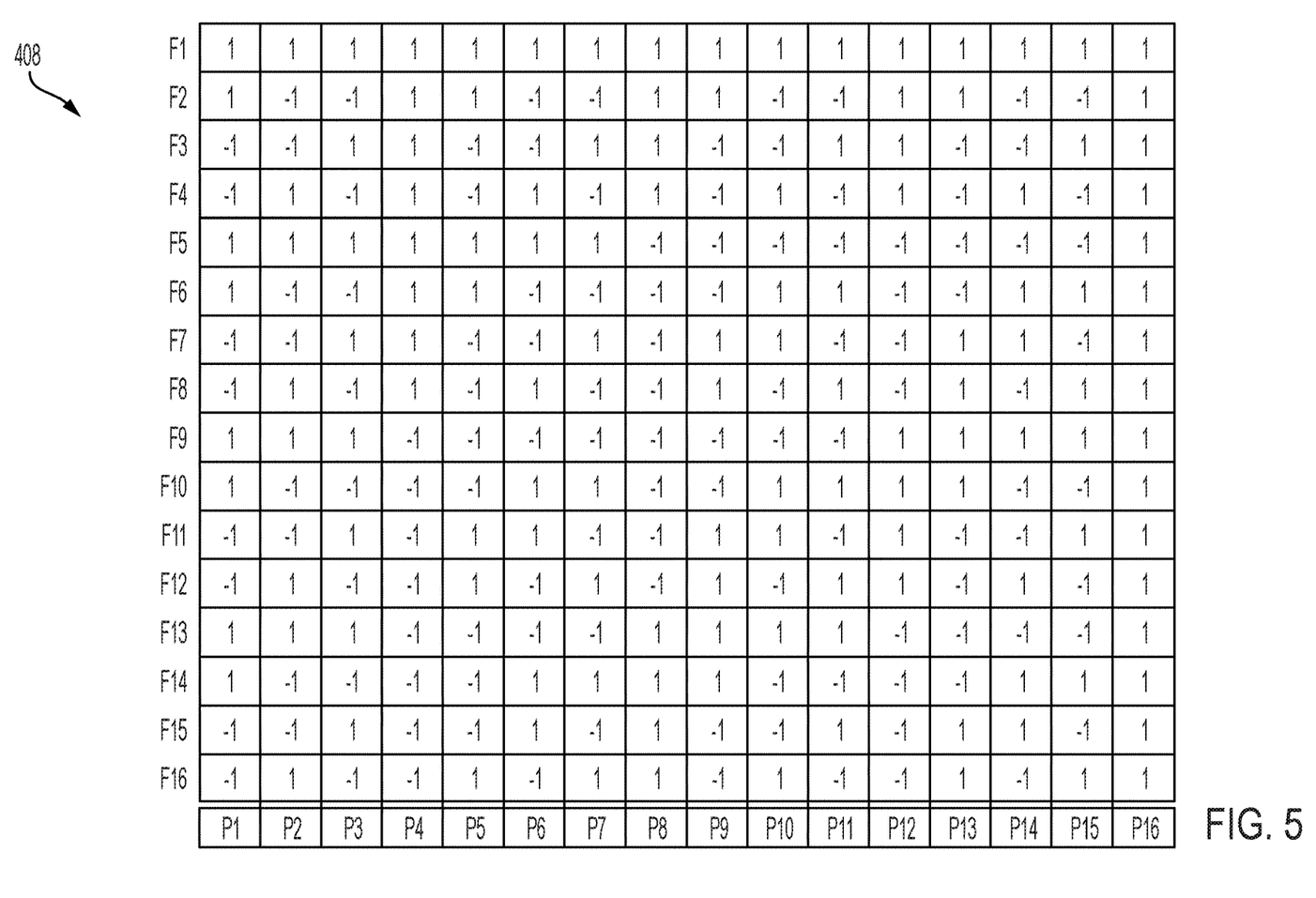
FIG. 5 is an example of a mask applied to a number of pixels generated by photodetector array according to a non-limiting embodiment.

FIG. 5 illustrates an example of a pixel mask 408 for performing high-resolution image reconstruction. The pixel mask 408 is defined by a plurality of measurement codes arranged in a plurality of columns and rows to define a grid. The measurement codes include positive value codes 500 (e.g., 1) and a negative value codes 502 (e.g., −1). Each column represents a pixel (P1-P16), and each row represents a frame (F1-F16).

The pixel mask 408 is generated according to a Hadamard matrix. A Hadamard matrix is a square matrix whose entries are either positive (+) or negative (−) and whose rows are mutually orthogonal. In other words, each pair of rows in the Hadamard matrix represents two perpendicular vectors, while in combinatorial terms, it means that each pair of rows has matching entries in exactly half of their columns and mismatched entries in the remaining columns. The n-dimensional parallelotope spanned by the rows of an n×n Hadamard matrix has the maximum possible n-dimensional volume among parallelotopes spanned by vectors whose entries are bounded in absolute value by 1.

Various Hadamard orders can be used to increase the amount of compression with a corresponding change in latency. A Hadamard matrix of 2 provides a compression ratio of 4 with a latency of 4 frames.

The Hadamard matrix defines the pixel mask 408, which can be utilized by an image controller to generate an encoded or compressed image stream. For example, the Hadamard matrix effectively maps the Group A, positive voltage (+) detectors 203.1 to the positive value codes 500 and the Group B, negative voltage (−) detectors 203.2 to the negative value codes 502 for each frame F1-F16. A reverse Hadamard transform (also referred to as an inverse Hadamard matrix) can then be applied to the encoded frames to decode or perform the high-resolution image reconstruction. The measurement matrices employed by the image controller can be generated and applied to the imagery by the image controller. The image controller can generate suitable masks by any of a variety of mechanisms. For example, the image controller can retrieve the pixel mask 408 defined by the Hadamard matrix from memory as appropriate It is understood that any suitable type of mask pattern sequences can be used to reconstruct an image at the FPA. While example embodiments of the disclosure are explained in conjunction with a Hadamard mask sequence, it is understood that any practical type of mask pattern and any useful computational imaging techniques can be used to meet the needs of a particular application. Example computational processing techniques are shown and described in U.S. Pat. No. 7,532,772, U.S. Patent Publication No. 2006/0038705, U.S. Pat. Nos. 9,445,115, and 9,983,063, all of which are incorporated herein by reference.

Figure 6:
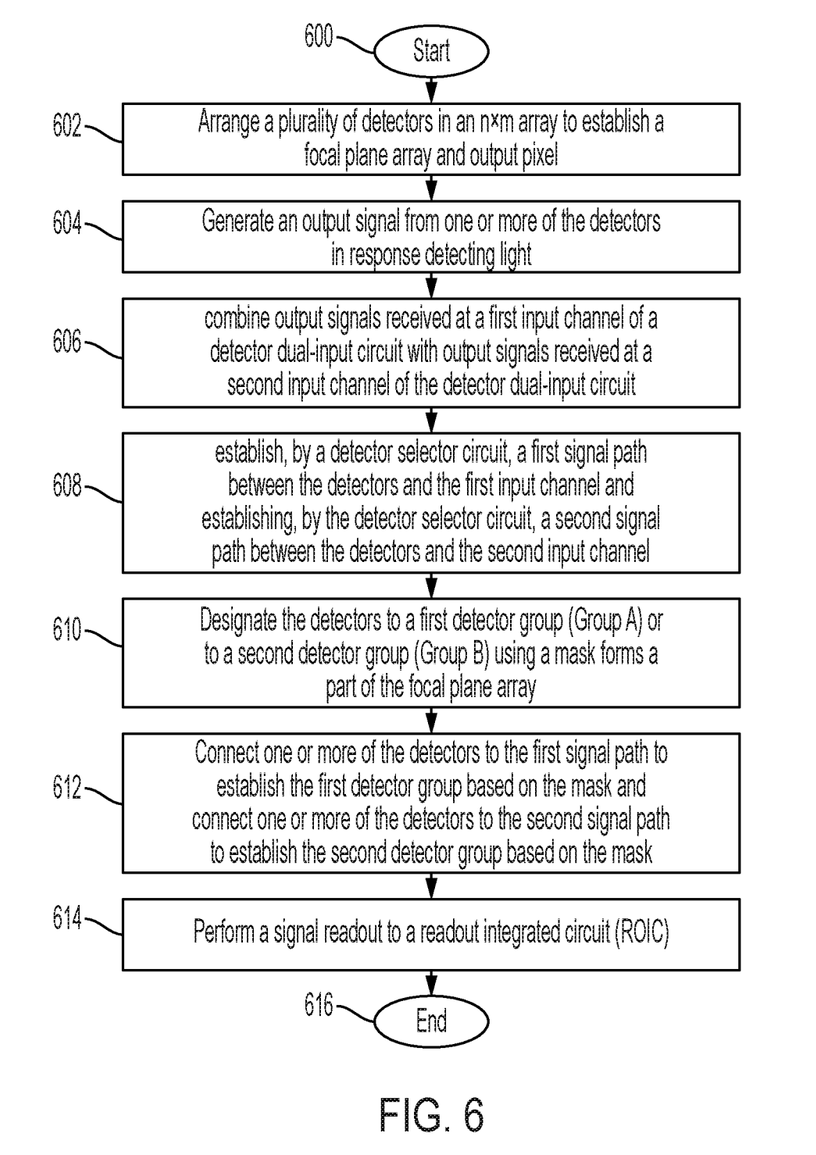
FIG. 6 is a flow diagram of an example sequence of steps for a coded aperture focal plane array in accordance with non-limiting embodiments of the disclosure.

Turning to FIG. 6, a flow diagram illustrates a method of generating image data according to a non-limiting embodiment. The method begins at operation 600, and at operation 602 a plurality of detectors are arranged in an n×m array to establish a focal plane array and an output pixel. The focal plane array comprises part of a readout integrated circuit package. At operation 604, an output signal is generated from one or more of the detectors in response detecting light, and at operation 606 output signals received at a first input channel of a detector dual-input circuit are combined with output signals received at a second input channel of the detector dual-input circuit. At operation 608, a detector selector circuit establishes a first signal path between the detectors and the first input channel and establishes a second signal path between the detectors and the second input channel. At operation 610, the detectors are mapped to a first detector group (Group A) or to a second detector group (Group B) using a mask that forms a part of the focal plane array. At operation 612, a select module connects one or more of the detectors to the first signal path to establish the first detector group based on the mask and connecting and connects one or more of the detectors to the second signal path to establish the second detector group based on the mask. At operation 614, a readout integrated circuit (ROIC) reads out the output from the detectors mapped to the first detector group (Group A) and the output of the detectors mapped to the second detector group (Group B) to generate an image, and the method ends at operation 616.

It is understood that any suitable type of mask pattern sequences can be used to encode and then reconstruct an image at the FPA. While example embodiments of the disclosure are explained in conjunction with a Hadamard mask sequence, it is understood that any practical type of mask pattern and any useful computational imaging techniques can be used to meet the needs of a particular application. Example computational processing techniques are shown and described in U.S. Pat. No. 7,532,772, U.S. Patent Publication No. 2006/0038705, U.S. Pat. Nos. 9,445,115, and 9,983,063, all of which are incorporated herein by reference.

Figure 7:
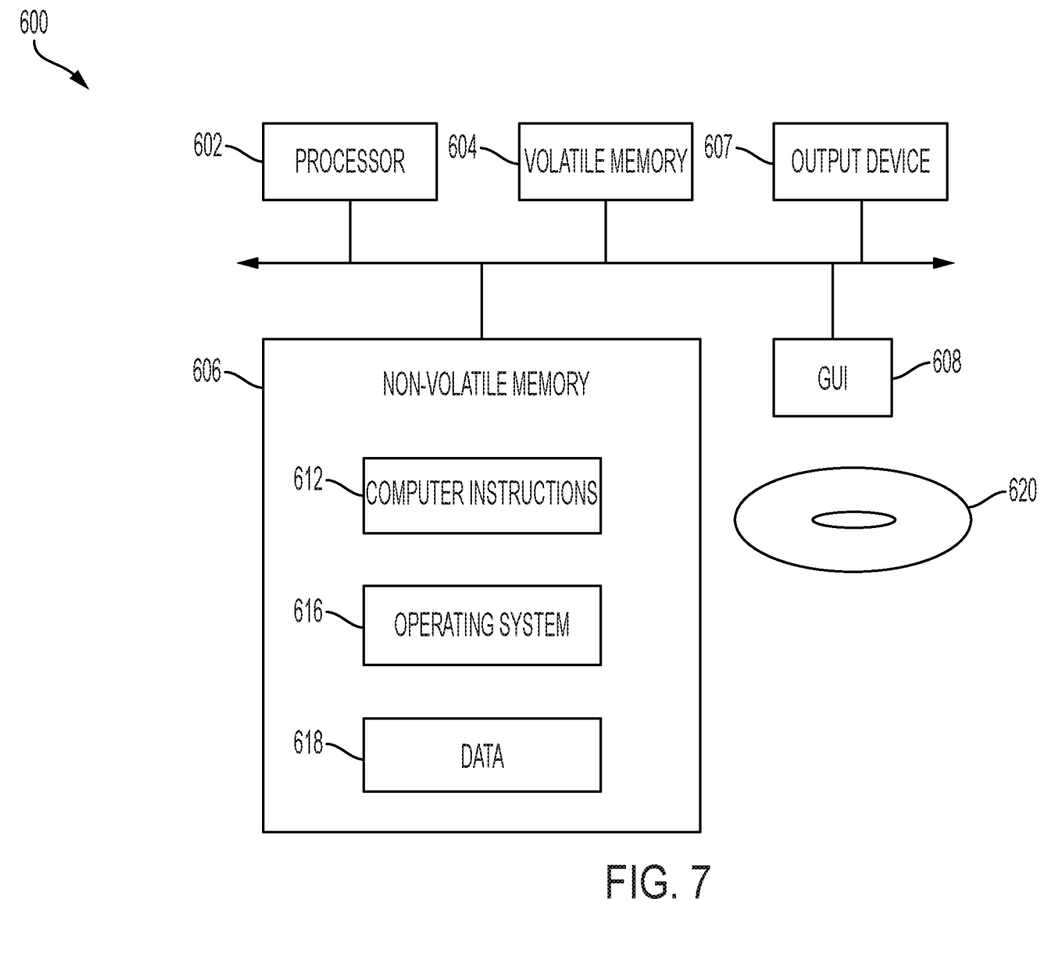
FIG. 7 is a schematic representation of an example computer that can perform at least a portion of the processing described herein.

With reference to FIG. 7, an example computer 600 that can perform at least a portion of the processing described herein is illustrated according to a non-limiting embodiment. The computer 600 can perform processing to implement a mask controller, such as the select module 214 of FIG. 2A, for example, as well as the operations illustrated in FIG. 6. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In a non-limiting embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., RAM/ROM, CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array), a general purpose graphical processing units (GPGPU), and/or an ASIC (application-specific integrated circuit)).

The corresponding structures, materials, acts, and equivalents of all means plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A sensing system, comprising:
   a focal plane array having an n×m array of detectors, wherein n and m are array element index values, and a single output pixel, wherein the focal plane array comprises part of a readout integrated circuit package;
   a detector dual-input circuit configured to combine outputs from the detectors received at a first input channel without outputs from the detectors received at a second input channel;
   a detector selector circuit establishing a first signal path between the detectors and the first input channel and a second signal path between the detectors and the second input channel, the detector selector circuit including an electronic mask forming a part of the focal plane array in the pixel and configured to map the detectors to one or both of a first detector group (Group A) and second detector group (Group B); and
   a select module configured to control the electronic mask so as to connect one or more of the detectors to the first signal path to establish the first detector group and to connect one or more of the detectors to the second signal path to establish the second detector group, wherein the select module connects the one or more of the detectors to the first and second signal paths to establish the first and second detector groups based on the electronic mask.

2. The sensing system of claim 1, wherein the combination of the outputs from the detectors included in the first detector group (Group A) and from the outputs of the detectors included in the second detector group (Group B) generates image data at a reduced resolution while a difference encodes full resolution information for each detector pixel in a time domain.

3. The sensing system according to claim 2, wherein the detector dual-input circuit further comprises:
   a first row select switch included in the first input channel and configured to selectively connect the first signal path to a first column busline; and
   a second row select switch included in the second input channel configured to selectively connect the second signal path to a second column busline.

4. The sensing system according to claim 2, further including an imager to focus light on the focal plane array.

5. The sensing system according to claim 2, wherein focal plane array comprises part of a readout integrated circuit package.

6. The sensing system according to claim 2, wherein the electronic mask is configured to provide Hadamard mask patterns.

7. The sensing system according to claim 2, wherein the electronic mask is configured to establish different electronic mask patterns, and the select module operates according to switch logic to cycle the electronic mask through the different mask patterns.

8. The sensing system according to claim 7, wherein the different mask patterns are applied to a region of interest in a field of view of the sensing system.

9. The sensing system according to claim 2, wherein the system provides a hemispherical field of view.

10. A method of generating image data, the method comprising:
arranging a plurality of detectors in an n×m array to establish a focal plane array, wherein n and m are array element index values, and a single output pixel, wherein the focal plane array comprises part of a readout integrated circuit package;
generating an output signal from one or more of the detectors in response detecting light;
combining output signals received at a first input channel of a detector dual-input circuit with output signals received at a second input channel of the detector dual-input circuit;
establishing, by a detector selector circuit, a first signal path between the detectors and the first input channel and establishing, by the detector selector circuit, a second signal path between the detectors and the second input channel;
mapping the detectors to one or both of a first detector group (Group A) or to a second detector group (Group B) using an electronic mask which forms a part of the focal plane array; and
connecting, by a select module, one or more of the detectors to the first signal path to establish the first detector group based on the electronic mask and connecting, by the select module, one or more of the detectors to the second signal path to establish the second detector group based on the electronic mask.

11. The method of claim 10, further comprising generating the image data based on a combination of the outputs from the detectors included in the first detector group (Group A) and the outputs of the detectors included in the second detector group (Group B).

12. The method of claim 11, further comprising performing a signal readout to a readout integrated circuit (ROIC) by performing one of a summation or subtraction of the combination of the outputs from the detectors included in the first detector group (Group A) and the outputs of the detectors included in the second detector group (Group B).

13. The method of claim 12, wherein performing the subtraction includes computing in the analog domain a difference between the outputs from the detectors included in the first detector group (Group A) and the outputs of the detectors included in the second detector group (Group B).

14. The method of claim 11, further comprising performing a signal readout to a readout integrated circuit (ROIC) by performing analog-to-digital conversion of each the outputs from the detectors included in the first detector group (Group A) and the outputs of the detectors included in the second detector group (Group B) into separate digital registers of the ROIC.

15. The method of claim 11, further comprising:
selectively connecting, via a first row select switch, the first signal path to a first column busline; and
selectively connecting, via a second row select switch, the second signal path to a second column busline.

16. The method according to claim 11, further comprising:
establishing different Hadamard mask patterns using the mask to;
cycling the electronic mask through the different mask patterns; and
changing the detectors included in the first and second groups based on the different mask patterns to generate different output signals that are delivered to the first and second input channels of the detector dual-input circuit.

17. A detector selector circuit comprising:
a focal plane array having an n×m array of detectors, wherein n and m are array element index values, and a single output pixel, wherein the focal plane array comprises part of a readout integrated circuit package;
a first signal path in signal communication with a first input channel of a detector dual-input circuit;
a second signal path in signal communication with a second input channel of the detector dual-input circuit; and
a plurality of switch circuits, each switch circuit configured to selectively connect a respective detector included in the array of the detectors to the first signal path or the second signal path,
wherein the switch circuits are in signal communication with a coded aperture select module, and wherein the coded aperture select module controls each switch circuit to connect the detectors to the first signal path or the second signal path.

18. The detector selector circuit of claim 17, wherein the detectors connected to the first signal path establish a first detector group configured to deliver first output signals to the first input channel, and wherein the detectors connected to the second signal path establish a second detector group configured to deliver second output signals to the second input channel.

19. The detector selector circuit of claim 18, wherein the first output signals and the second output signals are combined by the detector dual-input circuit to generate image data.

* * * * *